(12) United States Patent
Szolak et al.

(10) Patent No.: US 9,074,508 B2
(45) Date of Patent: Jul. 7, 2015

(54) EXHAUST-GAS PURIFICATION DEVICE, METHOD FOR EXHAUST-GAS PURIFICATION, CATALYTIC CONVERTER AND PYROLYSIS REACTOR

(75) Inventors: Robert Szolak, Freiburg (DE); Alexander Susdorf, Breisach (DE); Thomas Aicher, Freiburg (DE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 26 days.

(21) Appl. No.: 13/877,811

(22) PCT Filed: Sep. 30, 2011

(86) PCT No.: PCT/EP2011/004910
§ 371 (c)(1),
(2), (4) Date: May 7, 2013

(87) PCT Pub. No.: WO2012/045423
PCT Pub. Date: Apr. 12, 2012

(65) Prior Publication Data
US 2013/0219866 A1    Aug. 29, 2013

(30) Foreign Application Priority Data

Oct. 4, 2010 (DE) .................. 10 2010 047 249
Oct. 28, 2010 (DE) .................. 10 2010 049 957

(51) Int. Cl.
*B01J 7/00* (2006.01)
*B01J 23/74* (2006.01)
(Continued)

(52) U.S. Cl.
CPC .............. *F01N 3/10* (2013.01); *B01D 53/9431* (2013.01); *B01D 53/944* (2013.01);
(Continued)

(58) Field of Classification Search
CPC .............. B01J 7/00; B01J 23/74; B01J 37/00; C01B 3/22; C01B 3/24; C01B 3/26; B01D 53/94
USPC .............. 48/61, 76, 85, 197 R; 502/337, 338, 502/439; 60/295, 274
See application file for complete search history.

(56) References Cited

U.S. PATENT DOCUMENTS 3,957,804 A * 5/1976 Ishioka et al. ................ 546/317
4,187,200 A * 2/1980 Jenkin ................. 502/5
(Continued)

FOREIGN PATENT DOCUMENTS

JP          038467 A   2/1997
WO      03012269 A2   2/2003
WO    2008047321 A1   4/2008

OTHER PUBLICATIONS

Ahmed et al., "Decomposition of hydrocarbons to hydrogen and carbon" Applied Catalysis A: General, Elsevier Science, Amsterdam, NL, Bd. 659, Nr. 1-2, May 15, 2009, pp. 1-24.
(Continued)

*Primary Examiner* — Timothy Vanoy
(74) *Attorney, Agent, or Firm* — Gesmer Updegrove LLP (57) ABSTRACT

The present invention relates to an exhaust-gas purification device by means of which combustion exhaust gases emerging from combustion devices, in particular diesel engines, can be purified. At least a regeneration of the soot particle filter and/or the NOx catalytic converter can be attained by means of the exhaust-gas purification device.

21 Claims, 7 Drawing Sheets

(51) Int. Cl.
  *B01J 37/00* (2006.01)
  *B01D 53/94* (2006.01)
  *C01B 3/22* (2006.01)
  *C01B 3/24* (2006.01)
  *C01B 3/26* (2006.01)
  *F01N 3/10* (2006.01)
  *B01J 21/08* (2006.01)
  *B01J 23/755* (2006.01)
  *B01J 37/02* (2006.01)
  *F01N 3/20* (2006.01)
  *F01N 3/025* (2006.01)

(52) U.S. Cl.
  CPC ............... *B01D 2251/202* (2013.01); *B01D 2255/20738* (2013.01); *B01D 2255/20753* (2013.01); *B01D 2258/012* (2013.01); *B01J 21/08* (2013.01); *B01J 23/755* (2013.01); *B01J 37/0203* (2013.01); *C01B 3/22* (2013.01); *C01B 2203/06* (2013.01); *C01B 2203/1058* (2013.01); *F01N 3/025* (2013.01); *F01N 3/2033* (2013.01); *F01N 3/206* (2013.01); *F01N 2240/14* (2013.01); *Y02T 10/26* (2013.01)

(56) References Cited

U.S. PATENT DOCUMENTS

| | | | | |
|---|---|---|---|---|
| 4,661,468 | A * | 4/1987 | Lee et al. | 502/333 |
| 5,873,950 | A * | 2/1999 | Ganesan et al. | 148/206 |
| 7,082,753 | B2 * | 8/2006 | Dalla Betta et al. | 60/286 |
| 7,165,393 | B2 * | 1/2007 | Betta et al. | 60/286 |
| 7,614,220 | B2 * | 11/2009 | Breuer et al. | 60/295 |
| 7,888,283 | B2 * | 2/2011 | Huang et al. | 502/335 |
| 2008/0115485 | A1 | 5/2008 | Lee | |
| 2010/0175639 | A1 | 7/2010 | Al-Dalwood et al. | |

OTHER PUBLICATIONS

Rodriguez N.M. et al., "Carbon deposition on iron-nickel alloy particles" Applied Catalysis A: General, Elsevier Science, Amsterdam, NL, Bd. 148, Nr. 2 ,Jan. 2, 1997, pp. 265-282.

International Search Report issued in connection with PCT Application No. PCT/EP2011/004910, mailed on Jun. 5, 2012.

English translation mailed on Apr. 18, 2013 of the International Preliminary Report on Patentability issued in connection with PCT Application No. PCT/EP2011/004910, filed on Sep. 30, 2011.

* cited by examiner

EXHAUST-GAS PURIFICATION DEVICE, METHOD FOR EXHAUST-GAS PURIFICATION, CATALYTIC CONVERTER AND PYROLYSIS REACTOR

PRIORITY INFORMATION

The present application is a 371 National Phase Application of PCT/EP2011/004910, filed on Sep. 30, 2011, that claims priority to DE Application 102010047249.2, filed on Oct. 4, 2010 and DE Application 102010049957.9, filed on Oct. 28, 2010, both of which are incorporated herein by reference in their entireties.

BACKGROUND OF THE INVENTION

The present invention relates to an exhaust gas purification device with which combustion gases originating from combustion devices, in particular diesel engines, can be purified. With the exhaust gas purification device, at least one regeneration of the particulate filters and/or of the $NO_x$ catalyst can be achieved. A soot particulate filter and/or a catalyst for reducing the content of nitrous gases ($NO_x$ catalyst) is thereby introduced into the exhaust gas flow of the combustion device. The central thought of the present invention is based on the fact that, in a preceding pyrolytic process, a gas is produced from liquid or gaseous carbon-comprising combustibles by means of a pyrolysis process with the exclusion of oxygen or oxygen-comprising gases or water vapour, said gas predominantly comprising hydrogen or a synthesis gas, i.e. carbon monoxide and hydrogen. This pyrolytically produced hydrogen-rich gas mixture/synthesis gas is used for the purpose of heating a particulate filter via an oxidation catalyst or LNT (Lean Temperature $NO_x$ Trap). This pyrolytically produced hydrogen-rich gas mixture/synthesis gas is used in addition for reducing the nitrous gases in the $NO_x$ storage catalyst. The present invention likewise relates to a corresponding method for the gas purification, suitable catalysts for the pyrolysis process and also a corresponding pyrolysis reactor.

Figure 1:
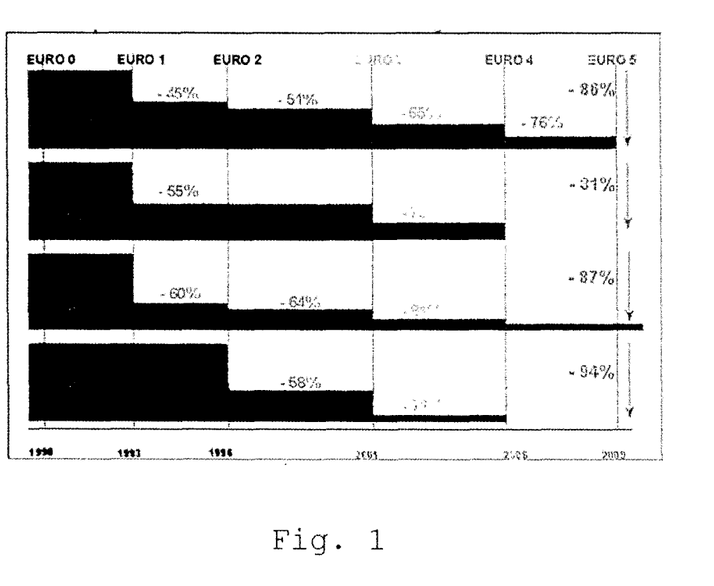
FIG. 1 displays the permissible emission limits for commercial vehicles in Europe.

The proportion of new registrations of diesel automotive vehicles in Germany has more than doubled from 1993 to 2003 from 19% to 42%. As a reason for this, there should be mentioned above all favourable fuel consumption and good driving properties based on a high torque at low speeds. At the same time, the exhaust gas limits have been made significantly stricter in Europe in recent years, in particular the particulates (PM) and the $NO_x$ emissions are intended to be further reduced. FIG. 1 (Department for the Environment and Transport, Baden-Württemberg, 2005) displays the permissible emission limits for commercial vehicles in Europe.

With the introduction of the Euro 4 standard in 2005, the upper limit for particulate emissions has been greatly reduced relative to 1993.

Figure 2:
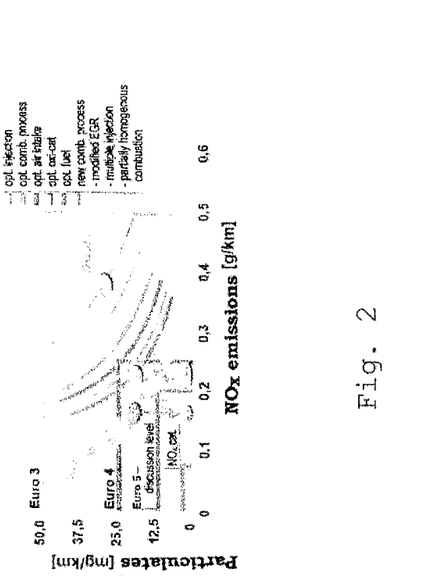
FIG. 2 shows how the particulate- and $NO_x$ emissions to date could be reduced by engine measures.

FIG. 2 shows how the particulate- and $NO_x$ emissions to date could be reduced by engine measures. In addition, the reduction of particulate and $NO_x$ emission limits is represented by the European exhaust gas standards. With the most modern engine technologies, the Euro 4 standard can be complied with. In view of the Euro 5 standard (introduction 2009), the use of particulate filters and measures for $NO_x$ reduction becomes absolutely necessary.

In addition the emission limits in force are also introduced for tractors and off-road vehicles. An extension to stationary applications will likewise follow.

Subsequently, measures known from the state of the art for regeneration of particulate filters or $NO_x$ removal, as have been used with exhaust gas purification processes to date, are described:

1. Regeneration of Articulate Filters

Particulate filters are loaded with particulates until a maximum permissible exhaust gas counter-pressure is reached. Then they must be regenerated. For the regeneration, normally exhaust gas temperatures of more than 600° C. at the filter entrance are required. Such high temperatures are however normally achieved only at high speeds of rotation at operating points near to full load. For this reason, aids are required for the particulate combustion both in engines in mobile use and for stationary uses in block-type thermal power plants.

Figure 3:
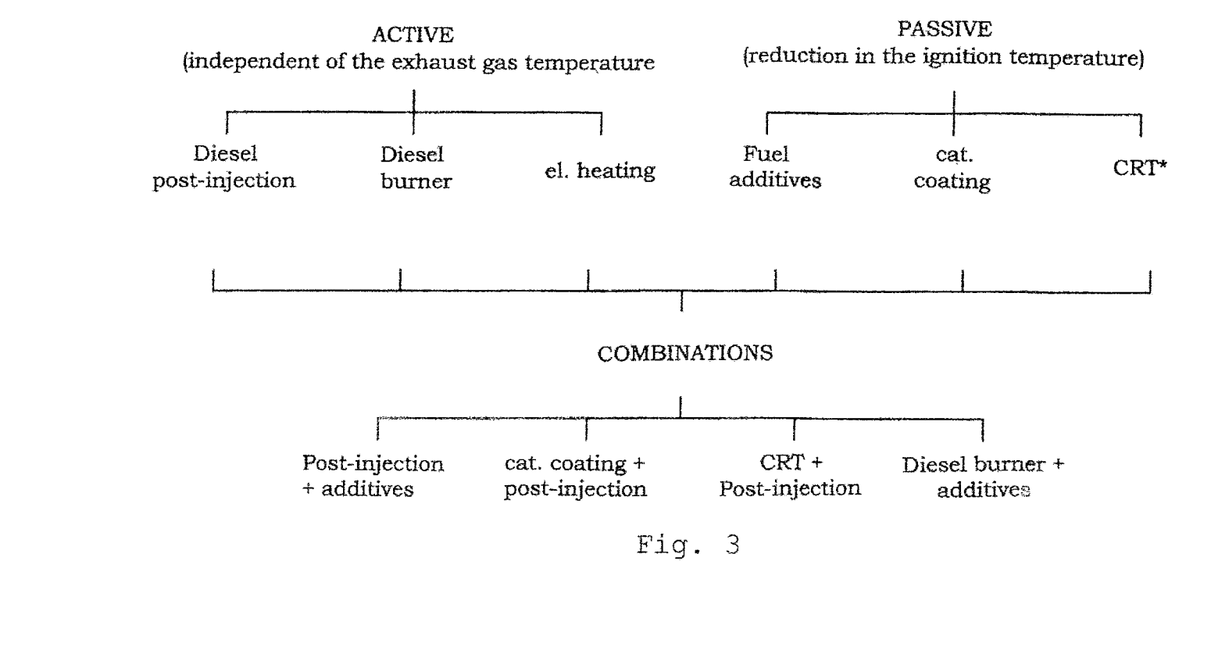
FIG. 3 shows a list of current methods for regeneration of particulate filters.

Basically, a differentiation can be made between active and passive regeneration. However, in practice frequently combinations of both are used. FIG. 3 shows a list of current methods for regeneration of particulate filters.

In the case of active regeneration processes, the exhaust gas or the particulate filter is heated by separate energy to the required oxidation temperature.

The systems of passive regeneration enable filter regeneration under specific operating conditions without specific initiation of the oxidation process. No separate energy is required in passive regeneration.

A current method for regeneration of the particulate filter is the combination of CRT (Continuously Regenerating Trap) and post-injection. The CRT system is a continuously operating regeneration system. An oxidation catalyst which oxidises the NO in the exhaust gas to form $NO_2$ is hereby fitted in front of the particulate filter. The $NO_2$ can then oxidise the particulates at significantly lower temperatures than molecular oxygen in the exhaust gas (approx. 450° C.). According to the operating state, the necessary $NO_2$ quantity cannot however be provided. If the exhaust gas counter-pressure exceeds a specific value because of the particulate loading, fuel is injected in front of the oxidation catalyst. The fuel oxidises in the catalyst and consequently heats the particulate filter. The particulates can then be combusted with the $NO_2$ and the oxygen.

Particulate filters have not yet been able to date to be effectively regenerated at all operating points of an automotive vehicle. In particular during low load operation (for example in town operation), the exhaust gas temperature is frequently too low to oxidise the injected fuel completely. In the case of low exhaust gas temperatures the result can be condensation effects on the oxidation catalyst, the injected fuel can then coat the catalyst and possibly damage it.

2. $NO_x$ Removal

At present there are two systems for removing $NO_x$, the SCR method and the $NO_x$ storage catalyst (LNT, Lean $NO_x$ Trap).

In the case of the SCR method, the reduction agent (a urea-water mixture) is conducted into the exhaust gas line of the engine. In the hot exhaust gas, the urea is converted to form ammonia. In the SCR catalyst, the nitrogen oxides are converted with ammonia to form water and nitrogen. This method is used at present with lorries. The SCR method is very efficient at temperatures >300° C., at exhaust gas temperatures <200° C. rather ineffective.

During "lean" operation (engine air ratio >1), the nitrogen oxides in the exhaust gas are stored temporarily in an $NO_x$ storage catalyst. The nitrogen oxides are thereby oxidised in the catalyst layer to form $NO_2$ and subsequently adsorbed on the storage material. In the intermittent operation, the storage catalyst is loaded and regenerated again. The regeneration is effected in the substoichiometric engine operation (engine air ratio ≤1). The incorporated $NO_2$ is thereby converted with the reduction agents HC (hydrocarbons) and CO to form $N_2$. The storage material is regenerated and is available for new $NO_x$ incorporations. This system is of interest above all for automotive vehicles since, in comparison with the SCR method, it can be constructed more compactly. The regeneration is normally effected at temperatures of >250° C. In town for example, the storage catalyst can only be heated up to 150 to 180° C. because of the low waste gas temperature. A reduction of the storage catalyst is thereby possible only in a restricted manner.

There are at present various possibilities for producing a synthesis gas. The current reforming methods (such as e.g. steam reforming CPox (catalytic partial oxidation) and ATR (autothermal reforming) can be used. In the case of steam reforming, water vapour is required in addition to the fuel. The reforming is an endothermic process, i.e. heat must be supplied from outside. The space velocity during steam reforming is low in comparison with ATR or CPox. In addition, carbon is formed at too low temperatures and/or too little water. In the case of partial oxidation, the combustible is converted with oxygen to form a synthesis gas. In the case of CPox, it is important that the process parameters, temperature and air ratio, are adjusted precisely since otherwise carbon is formed. Water vapour and air are required with ATR. Similarly to the above-described reforming methods, this method is susceptible to the formation of carbon.

The carbon blocks the active centres in the catalyst and is in addition the nucleus cell for formation of new carbon. The catalyst becomes inactive and must be regenerated. The catalysts used during the reforming are not designed for such regeneration cycles. The thereby occurring, higher temperatures can lead to sintering effects and significantly reduce the activity of the catalyst. The processes become inefficient. In addition, normally noble metals are used as active components. The catalysts which are used during the reforming are therefore very expensive. Systems for exhaust gas post-treatment must primarily be simple, cheap and robust.

Such a reforming unit for producing hydrogen by steam reforming, partial oxidation of hydrocarbons and/or mixed forms thereof is known from WO 2004/090296. The reforming reactor described here and also the synthesis gas produced therewith can be used for $NO_x$ removal and for regeneration of particulate filters. The reforming unit can be positioned directly in the exhaust gas space and be operated with exhaust gas. For the steam reforming, the water comprised in the exhaust gas and also the residual oxygen can be used.

Disadvantages of this method relative to pyrolysis are:
The catalyst which is used based on noble metals is very expensive.
The method is very susceptible to the formation of carbon.
Integration of the reformer in the exhaust gas space appears very difficult on the basis of the changing conditions and the susceptibility to the formation of carbon.

SUMMARY OF THE INVENTION

Starting herefrom, it was therefore the object of the present invention to indicate a device for exhaust gas purification and also a corresponding method which avoids the above-described disadvantages of the state of the art. Likewise, it was the object of the present invention to provide a corresponding pyrolysis catalyst and also a method for producing this catalyst and a pyrolysis reactor, which enable the production of a hydrogen-rich gas mixture/synthesis gas by a pyrolytic route.

According to the invention, an exhaust gas purification device is therefore proposed. Likewise, a method for exhaust gas purification is provided according to the invention. The invention relates in addition to a catalyst and also a method for producing the catalyst according to the invention. According to the invention, a pyrolysis reactor which goes back to the catalyst according to the invention is likewise provided. The respective dependent patent claims thereby represent advantageous developments.

According to the invention, an exhaust gas purification device is hence provided, which comprises
a) at least one pyrolysis reactor which has a catalyst and which, by means of intermittently progressing anaerobic catalytic pyrolysis of combustibles, selected from the group consisting of liquid or gaseous hydrocarbons, oxygen-comprising combustibles (e.g. alcohols, biooils, biodiesels, pyrolysis oils), liquid or gaseous hydrocarbon mixtures or gas mixtures which comprise hydrocarbons, preferably fuels, in particular diesel fuel, and aerobic regeneration of the catalyst, enables the production of a hydrogen-comprising gas mixture and a hydrogen-comprising gas mixture with cracked products from the material used, and
b) connected subsequent to the pyrolysis reactor
   i. at least one oxidation catalyst and/or a soot particulate filter and/or
   ii. at least one catalyst for reducing the content of nitrous gases ($NO_x$ catalyst) and/or
   iii. at least one "Lean $NO_x$ Trap (LNT)" and/or a soot particulate filter,
the oxidation catalyst and/or the soot particulate filter and/or the $NO_x$ storage catalyst and/or LNT and soot particulate filter being disposed in the exhaust gas flow of a combustion device, preferably of an internal combustion engine, in particular of a diesel engine.

According to the invention, it is hence provided that a pyrolysis reactor is connected in front of either an oxidation catalyst and particulate filter or an $NO_x$ catalyst or an LNT. The possibility is likewise offered that another oxidation catalyst (either as a separate component in the exhaust gas flow or between pyrolysis reactor and particulate filter) is connected in front of the particulate filter. This possibility likewise applies to the LNT. In addition, all the components can be combined to form a total exhaust gas purification system by for example particulate filter and $NO_x$ catalysts being connected in succession.

The exhaust gas purification device according to the invention is based on the principle that for example particulates and/or nitrous gases, which are comprised in the exhaust gas flow originating from a combustion device, are separated from the exhaust gas flow by means of particulate filters or $NO_x$ catalysts. For particulate filter regeneration and/or for regeneration of $NO_x$ storage catalysts, a hydrogen-comprising gas mixture is used according to the invention. This hydrogen-comprising gas mixture thereby originates from a pyrolysis reactor, the pyrolysis reactor being based on an anaerobic reaction principle. Gaseous or liquid hydrocarbon-comprising combustibles are thereby converted under anaerobic conditions, i.e. with the exclusion of air, oxygen or water vapour, to form a hydrogen-comprising gas mixture. The hydrogen-comprising gas mixture produced from the combustibles during the anaerobic pyrolysis can thereby be for example a gas mixture made of hydrogen and alkanes, alkenes and/or alkines produced from the combustible. For example, the gas mixture can comprise hydrogen and methane. It is likewise possible however that the gas mixture comprises residual fuels and/or cracked products in addition to the hydrogen.

For particular preference, a synthesis gas-comprising gas mixture, i.e. a gas mixture which also comprises carbon monoxide in addition to hydrogen, is produced during the pyrolysis.

The above-mentioned synthesis gas-comprising gas mixture can thereby consist for example of pure synthesis gas but also comprise gas mixtures which can comprise, in addition to the essential components of the synthesis gas, i.e. CO and $H_2$, also hydrocarbons such as for example alkanes, alkenes, in particular methane. In addition, also residues of the combustible or cracked products which are used, i.e. fragments of the hydrocarbons which are used, are conceivable in the case of the obtained synthesis gas-comprising gas mixtures.

Combustibles which can be used for particular preference are thereby for example gaseous hydrocarbons, such as methane, ethane, propane, butane, etc. or mixtures hereof, liquid hydrocarbons, but also mixtures hereof. Diesel, heating oil, petrol, kerosene etc. should thereby be mentioned as particularly preferred. Likewise, oxygen-comprising organic compounds, such as for examples alcohols, organic acids, organic esters, biodiesels, biooils, pyrolysis oil (for example flash pyrolysis) etc. can be used as combustibles which are suitable according to the invention. Obviously also all mixtures of the previously mentioned components are possible.

In comparison with the solutions known from the state of the art, the new exhaust gas purification device offers several advantages.

1. In comparison with other synthesis gas generators, such as steam reformers, CPox (catalytic partial oxidation) or ATR (autothermal reforming), the pyrolysis system is more robust, the control is very much simpler. Parameters, such as air ratio and temperature, need not be adjusted exactly and also no additional water is required. The current reforming methods require water and/or air. No further reaction partner is required during the pyrolysis in addition to the fuel. The regeneration can be effected with a very low air volume flow or with exhaust gas.
2. The formation of carbon is a component of the reaction during pyrolysis. In the case of current reforming catalysts, regeneration is not readily possible since the high temperatures occurring during the regeneration can damage the catalyst.
3. The pyrolysis system can be operated with exhaust gas instead of air for regeneration, consequently an air compressor or a fairly large compressed air tank can be dispensed with. The regeneration can be operated in addition with a low air flow. Components with high electrical consumption, such as air pumps or a large fan, can be dispensed with.
4. On the basis of the intermittent operation with a reactor (pyrolysis regeneration) or in the case of two reactors which pyrolyse and regenerate alternately, the system need be heated only at the beginning. Thereafter, the system can be operated without external heat supply.
5. Simple operation management; the diesel and the air are switched on alternately. If in front of the pyrolysis reactor a combustible evaporator is connected, which evaporates the liquid combustible by partial oxidation, the diesel is switched on in the interval, the air or the exhaust gas are conducted continuously through the pyrolysis system.
6. The gas occurring during the regeneration preferably comprises a high proportion of carbon monoxide. The carbon monoxide can be in turn ignited at the oxidation catalyst at low temperatures. Hence both gas compositions are advantageous for the exhaust gas post-treatment after pyrolysis and after regeneration.

In a preferred embodiment, the pyrolysis reactor includes a housing, in the interior of which the catalyst is disposed, the catalyst including a carrier which is coated at least partially with an alloy, comprising iron and nickel.

Such a catalyst corresponds to the catalyst claimed according to the invention by claim 19.

At present, there is no commercially available catalyst which is suitable for a pyrolysis system. A catalyst which is thermally and long-term stable has been developed. During development of the catalyst, expensive noble metals were dispensed with, as active component a nickel alloy has therefore been used, which is applied for example on a silicon dioxide carrier. The composition of the active component, the preparation method and the carrier have a great influence on the gas composition and the stability of the catalyst. Many possible carriers and active components were tested and investigated with respect to the thermal stability. The developed catalyst can pyrolyse a large number of combustibles, gaseous and liquid combustibles can be used, the type and composition of the combustible also influences the product gas composition.

The developed catalyst (see further on) is cheap and robust. It could be detected in long-term tests that the catalyst is thermally stable (up to >1,000° C.). The catalyst comprises no noble metals, it can therefore be produced very economically and is consequently suited particularly well to exhaust gas post-treatment. The pyrolysis can be operated in a high performance range.

In a further preferred embodiment, the molar ratio between iron and nickel in the catalyst according to the invention, which is suitable in particular for being used in a pyrolysis reactor in an exhaust gas purification device according to the present invention, is between 3:1 and 1:5, preferably between 1:2 and 1:4, in particular between 1:2.8 and 1:3.2.

In a further preferred embodiment of the catalyst according to the invention, the total content of nickel and iron relative to the carrier is between 0.5 and 15% by weight, preferably between 1 and 10% by weight, particularly preferred between 2.5 and 7.5% by weight. Furthermore, it is advantageous if the material of the carrier is selected from the group consisting of ceramic materials, in particular silicon dioxide, silicon carbide, aluminium oxide, silicates, in particular alumosilicates, zeolites, cordierite and/or metals.

Particularly preferred geometric forms of the catalyst according to the present invention are thereby present in the form of a powder, a granulate, a honeycomb, a foam, a net or a metal sheet.

In a particularly preferred embodiment, the exhaust gas purification device includes a combustible evaporator which is disposed in the housing of the pyrolysis reactor and connected in front of the catalyst or is connected in front of the pyrolysis reactor as a separate component. Such combustible evaporators and also methods for operation thereof are known for example from publications EP 0 716 225 A1, DE 10 2006 060 669 A1 and also DE 10 2010 012 945. These evaporators can be used in particular in the case of the exhaust gas purification device according to the invention. The functional principle of such evaporators is based on partial oxidation of the combustibles with for example air, as a result of which thermal energy is provided for combustible evaporation (evaporation enthalpy). The thus formed components, hydrogen and carbon monoxide, and also the shorter hydrocarbons and olefins, formed by cracking reactions, offer advantages in the:

a) NO$_x$ removal (see table 2) and
b) ignition temperature in the oxidation catalyst for the particulate filter regeneration.

The pyrolysis reactor according to the invention can thereby have a one-part configuration, i.e. have a gas inlet and outlet and also a catalyst disposed therebetween. Such a reactor can be operated in alternating operation between pyrolysis and regeneration, i.e. intermittently.

In a further advantageous embodiment, the pyrolysis reactor has an at least two-part configuration along its through-flow direction. In the case of such a two-part embodiment of the pyrolysis reactor, at least two separate chambers which can be constructed identically are present. In both chambers, at least one catalyst which has the above-described properties is comprised. In addition, a combustible evaporator, as described above, can be connected in front of each chamber separately. Likewise, it is however also possible that merely one combustible evaporator is present with which the two chambers of the reactor can be actuated at different times. Such a configuration of the pyrolysis reactor makes it possible that the intermittently progressing catalytic pyrolysis and aerobic regeneration of the catalyst can take place in both chambers temporally offset; i.e. whilst for example the pyrolysis reaction takes place in the first chamber, the regeneration can take place in the second chamber and vice versa. Both processes are thereby implemented preferably in alternating operation between both chambers. Since the two chambers are in the immediate vicinity of each other, the thermal energy required for the pyrolysis can thus be delivered directly by the regeneration process in which carbon deposited on the catalyst surface by oxygen oxidation is converted into carbon monoxide or carbon dioxide. In this respect, particularly efficient and constant operation of the pyrolysis reactor and hence of the entire exhaust gas purification device is possible. The two chambers can be thereby disposed adjacently, however it is likewise possible that the one chamber is configured concentrically in the other chamber.

Likewise it is preferred if the pyrolysis reactor has at least one inlet in the form of at least one air supply and/or at least one nozzle for supplying or injecting fuels.

In particular diesel particulate filters are suitable, according to the invention, as particulate filter, wall flow filters or partial flow filters are thereby particularly preferred.

Preferred suitable NO$_x$ catalysts are thereby selected from the group consisting of NO$_x$ storage catalysts (for example LNT).

It is likewise conceivable that the pyrolysis reactor of the above-described exhaust gas purification device is disposed in the main flow or in a side flow of the exhaust gas flow of the combustion unit, or is configured as a separate component. In the case of such an embodiment, exhaust gas from the combustion device can be used directly for the purpose of regenerating the catalyst.

According to the invention, a method for purification of exhaust gases originating from a combustion device is likewise provided by particulate filter regeneration and/or at least partial removal of particulates and/or nitrous gases from the exhaust gases, in which, in the exhaust gas flow of the combustion device, at least one oxidation catalyst and/or one particulate filter and/or at least one catalyst for reducing the content of nitrous gases (NO$_x$ catalyst) or LNT (lean NO$_x$ trap) and/or a particulate filter is disposed, the at least one particulate filter and/or at least one NO$_x$ catalyst being supplied at least at times during the combustion process with hydrogen-rich gas mixtures or synthesis gases which are produced by intermittently progressing anaerobic catalytic pyrolysis of combustibles, selected from the group consisting of liquid or gaseous hydrocarbons, liquid or gaseous hydrocarbon mixtures, oxygen-comprising combustibles (e.g. alcohols, biooils, biodiesels, pyrolysis oils) or gas mixtures which comprise hydrocarbons, preferably fuels, in particular diesel fuels, and with hydrogen-comprising gas mixtures which are produced by aerobic regeneration of the catalyst, in particular hydrogen- and carbon monoxide-comprising gas mixtures or synthesis gases. The pyrolysis is effected with the exclusion of oxygen, air and/or water vapour, whilst an oxygen-comprising gas mixture, e.g. air or oxygen-comprising combustion gases, are supplied during the regeneration process. The pyrolysis and the regeneration are thereby implemented alternately (=intermittently).

The method according to the invention can be implemented particularly preferably with the above-described exhaust gas purification device.

During the method according to the invention, the combustible which is used, according to the type, is accordingly converted to form a hydrogen-rich product gas or to form a synthesis gas. During the pyrolysis, hydrocarbons are split thermochemically at fairly high temperatures, preferably between 500 and 1,000° C. During splitting, solid carbon is produced and a product gas which, according to the combustible and reaction condition, has a high hydrogen concentration. Decomposition is effected with the influence of the catalyst without the addition of oxygen or other reaction partners, rather exclusively under the effect of heat.

In the case of aerobic pyrolysis, in addition, carbon is deposited on the catalyst. This carbon can be removed under oxidative conditions during the regeneration phase. Oxygen or an oxygen-comprising gas mixture, for example exhaust gas, is thereby introduced into the pyrolysis reactor and the deposited carbon and/or residual combustible is converted to form a hydrogen- and/or carbon monoxide-comprising gas mixture. Also this gas mixture can be released into the adjacent exhaust gas purification devices, such as e.g. particulate filter and/or NO$_x$ catalyst, and can be used there for further exhaust gas purification and/or regeneration of the exhaust purification devices which are used.

The newly developed method is simple, cheap and robust, and therefore particularly well suited to the exhaust gas post-treatment. According to the fuel which is used and also choice of time duration of each pyrolysis step or regeneration step, different product gases can thereby be obtained. In this respect, reference is made in particular to the gas mixtures already described further back.

In an advantageous embodiment of the method, the combustibles are contacted with a pyrolysis-catalysing catalyst during the catalytic pyrolysis and, at temperatures between 300 and 1,000° C., preferably between 500 and 900° C., particularly preferred between 700 and 800° C., are pyrolysed to form a hydrogen-comprising gas mixture.

Furthermore, it is preferred if the pyrolysis is implemented alternately with a regeneration phase, oxygen or an oxygen-comprising gas mixture, but no combustible, being supplied to the reactor during the regeneration phase.

In the case of the above-mentioned alternating operation of the pyrolysis reactor, the latter is thereby operated alternately by feeding in the combustible and implementing a pyrolysis with oxygen exclusion, the combustible injection is switched off in the so-called regeneration phase or a regeneration step, and oxygen or oxygen-comprising gas mixtures are added to the pyrolysis reactor. As a result, oxidation of the carbon layer which is formed on the catalyst surface during pyrolysis takes place; according to the reaction conditions, this is converted to form carbon monoxide or carbon dioxide. The catalyst surface is thereby uncovered again; the catalyst is regenerated.

In a particularly preferred embodiment, a pyrolysis reactor which has an at least two-part configuration along its throughflow direction is used, the pyrolysis being implemented alternately with the regeneration phase antipodally in the two parts of the pyrolysis reactor. In the case of an antipodal operation of such a two-part pyrolysis reactor, there takes place, in two different parts of the pyrolysis reactor, for example in the case where the pyrolysis reactor consists of two parts, a pyrolysis or a regeneration in respectively one part of the pyrolysis reactor, respectively separately from each other and simultaneously, i.e. a pyrolysis is implemented in the first part of the pyrolysis reactor, in the other part of the pyrolysis reactor a regeneration. After completion of the regeneration of the catalyst, implementation of the pyrolysis then takes place in the other part. At the same time, the first part is thereby regenerated. Since the regeneration process takes place exothermally, the necessary thermal energy is supplied simultaneously to the respectively other part in which the endothermal pyrolysis is taking place. For this case the pyrolysis catalyst requires no external energy supply to ensure continuous pyrolysis.

In particular in the case where liquid combustibles are used, an evaporation of these combustibles is implemented before the pyrolysis step. These combustibles are converted into the gaseous state and supplied subsequently to the pyrolysis step.

Furthermore, it is preferred if the evaporation enthalpy, which is required for evaporation of the liquid combustibles, is provided by partial oxidation of the used liquid combustibles and/or by heat exchange with the exhaust gases originating from the combustion device. For this purpose, for example the combustible evaporators described further back can be used.

Furthermore, it is preferred that, before or during the first beginning of the pyrolysis, the catalyst and/or the pyrolysis reactor and/or the evaporator is heated by separate heating and/or by oxidation of the combustibles and/or by heat exchange with the combustion exhaust gases.

According to the invention, a catalyst is likewise provided, as described already above, which catalyst includes a ceramic carrier which is coated at least partially with an alloy comprising iron and nickel.

With respect to advantageous embodiments of the catalyst, reference is made to the explanations made already further back.

According to the invention, a method for producing the previously described catalyst is likewise indicated, in which a ceramic carrier material is wetted with an aqueous solution, comprising iron- and nickel salts and also a complexing agent, dried and subsequently calcinated at temperatures above 200° C., the complexing agent being used superstoichiometrically with respect to the total quantity of iron- and nickel salts.

Preferably a complexing agent is used during the method in order to increase the dispersivity of iron and nickel on the carrier surface. Preferred complexing agents are organic acids, in particular di- or higher valency acids, such as e.g. citric or tartaric acid.

In a preferred embodiment, there are used as iron- and/or nickel salts, in particular the nitrates, chlorides, bromides, citrates, tartrates thereof or mixtures hereof.

In a further preferred embodiment of the production method, a powder, a granulate, a honeycomb body, metal sheets or corresponding foamed materials are used as carrier material.

Furthermore, it is preferred if the drying is implemented at temperatures between 20 and 190° C. and/or over a period of time between 12 hours and 5 days.

Preferred conditions which prevail during the calcination are for example temperatures between 400 and 1,000° C., preferably between 500 and 700° C. The calcination is thereby preferably implemented over a period of time between 1 and 12 hours, preferably between 3 and 5 hours.

According to the invention, a pyrolysis reactor is likewise provided, which includes a housing having at least one frontside inlet and at least one rear-side outlet and also a previously described catalyst which is disposed in the housing between inlet and outlet.

Preferred embodiments of the pyrolysis reactor, such as for example the two-part embodiment, were already explained further back in detail.

DETAILED DESCRIPTION OF THE ILLUSTRATED EMBODIMENTS

The present invention is explained in more detail with reference to the subsequent embodiments and also examples without restricting the invention to the illustrated embodiments.

Regeneration of Particulate Filters

Tests have shown that the ignition temperature in the oxidation catalyst (light-off temperature) can be significantly reduced by introducing a synthesis gas. The tests were implemented once with and once without $NO_x$ in the exhaust gas (250 ppm).

Table 1 shows the light-off temperature of a synthesis gas on the oxidation catalyst with and without $NO_x$.

TABLE 1

| Conditions | Light-off temperature |
|---|---|
| $CO + H_2$ | 140° C. |
| $CO + H_2 + NO_x$ | 160° C. |

Tests have shown that introducing a synthesis gas offers great advantages relative to post-injection with liquid combustibles (CRT with post-injection), the ignition temperature could be reduced significantly. The particulate filter can be regenerated with synthesis gas at all operating points.

NO$_x$ Removal

Likewise, tests for NO$_x$ removal from diesel exhaust gases were implemented with various reduction agents and exhaust gas temperatures. The tests were implemented with HC, CO and mixtures of HC, CO and H$_2$.

In table 2, the NO$_x$ conversion with different exhaust gas temperatures and reduction agents can be seen.

TABLE 2

NO$_x$ removal from diesel exhaust gases

| Composition reduction agent | NO$_x$ conversion at | | | | | |
|---|---|---|---|---|---|---|
| (% by vol.) | 150° C. | 200° C. | 250° C. | 300° C. | 350° C. | 400° C. |
| 1% C$_3$H$_6$ | 14 | 84 | 100 | 100 | 99 | 92 |
| 3% CO | 38 | 59 | 53 | 44 | 38 | 36 |
| 2% CO, 1% H$_2$ | 51 | 58 | 53 | 45 | 37 | 26 |
| 0.33% C$_3$H$_6$, 2% CO | 32 | 60 | 92 | 95 | 93 | 87 |
| 0.33% C$_3$H$_6$, 2% CO, 1% H$_2$ | 52 | 81 | 98 | 96 | 92 | 72 |

Tests have shown that the NO$_x$ storage catalyst can be regenerated with HC as reduction agent only at fairly high exhaust gas temperatures (>200° C.). The best results were achieved with a mixture of HC, CO and H$_2$, at an exhaust gas temperature of 150° C. an NO$_x$ conversion of 50% could already be achieved. The NO$_x$ concentration could hence be significantly reduced even in town operation.

It was detected in tests that the pyrolysis is possible with pre-evaporated diesel fuel. The patented combustible evaporators, such as in EP 0 716 225 A1 and DE 10 2006 060 669 A1 and also DE 10 2010 012 945, can thereby be used inter alia. Further evaporation methods are conceivable, the combustible can in addition be added in liquid form. The combustible/vapour is converted in the pyrolysis reactor in the above-described manner according to the invention to form a synthesis gas.

Figure 4:
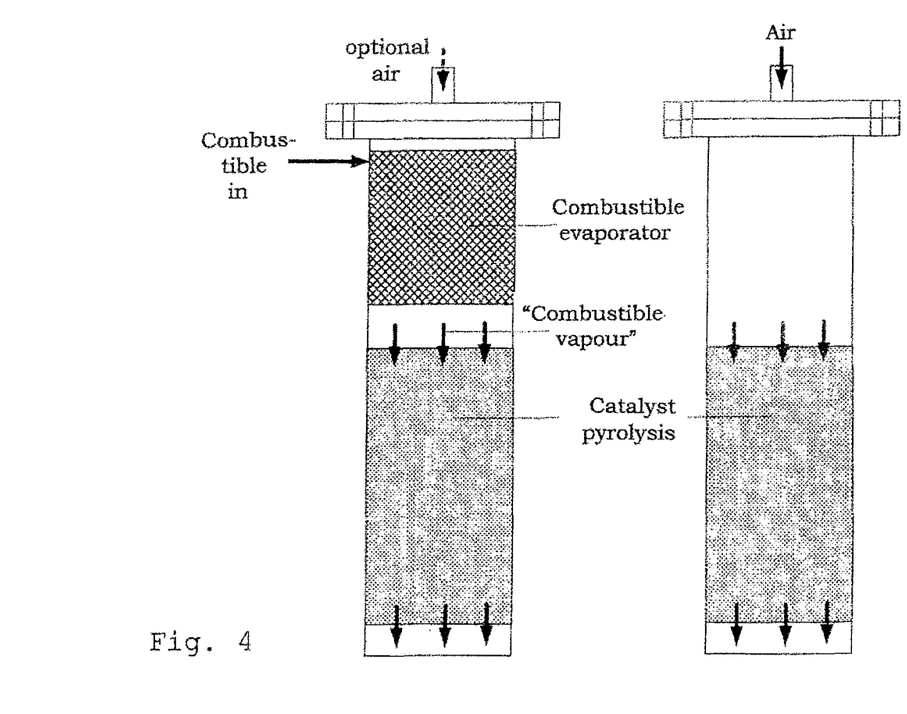
FIG. 4 illustrates a first embodiment of a pyrolysis reactor according to the invention.

A combustible evaporator was coupled to a pyrolysis reactor. Evaporator and pyrolysis reactor are accommodated in one reactor housing, hence a uniform inflow of the combustible vapour at the catalyst entrance is achieved and the System can be constructed very compactly. In FIG. 4 illustrates a first embodiment of a pyrolysis reactor according to the invention can be seen.

In the reactor (image on the left), the combustible vapour in the pyrolysis reactor is converted into a synthesis gas. The combustible supply is interrupted if the catalyst is laden with carbon. The hereby implemented pyrolytic reaction is implemented with the exclusion of oxygen, in particular of air or oxygen-comprising exhaust gases, i.e. anaerobically. In FIG. 4, an additional air inlet is illustrated but which serves merely for the purpose of supplying the combustible evaporator, which is connected in front of the catalyst, substoichiometrically with air. A partial oxidation of the combustible used hereby takes place, i.e. a part of the combustible is oxidised to form CO or CO$_2$. The hereby released thermal energy is used to evaporate the combustible. Preferred combustible evaporators are known from the above patent applications and can be used according to the invention in the pyrolysis reactor. In the image on the right, the regeneration of the catalyst with air can be seen. If the evaporation process is operated with air, the air flow can flow continuously through the reactor. The combustible evaporator, in the right part of FIG. 4, is not illustrated for the sake of clarity. The accumulated carbon is thereby oxidised with air to form CO and CO$_2$ (image on the right). The method according to the invention is now effected such that an anaerobic pyrolysis (left part of FIG. 4) is operated alternately, i.e. intermittently, with the regeneration of the catalyst illustrated in the right part of FIG. 4. The combustible evaporator can be operated during the pyrolysis likewise with oxygen-comprising exhaust gases.

The process need only be heated at the beginning. During the pyrolysis, the catalyst temperature drops because of the endothermal pyrolysis reaction, as a result of the heat released during the regeneration, the reactor is heated again. No heat requires therefore to be supplied from outside during operation.

Both product gases, the synthesis gas after the pyrolysis and the regeneration gas, can reduce the ignition temperature on the oxidation catalyst. The regeneration gas comprises up to 30% by volume of CO, hence the pyrolysis is very well suited to use in exhaust gas post-treatment systems.

Figure 5:
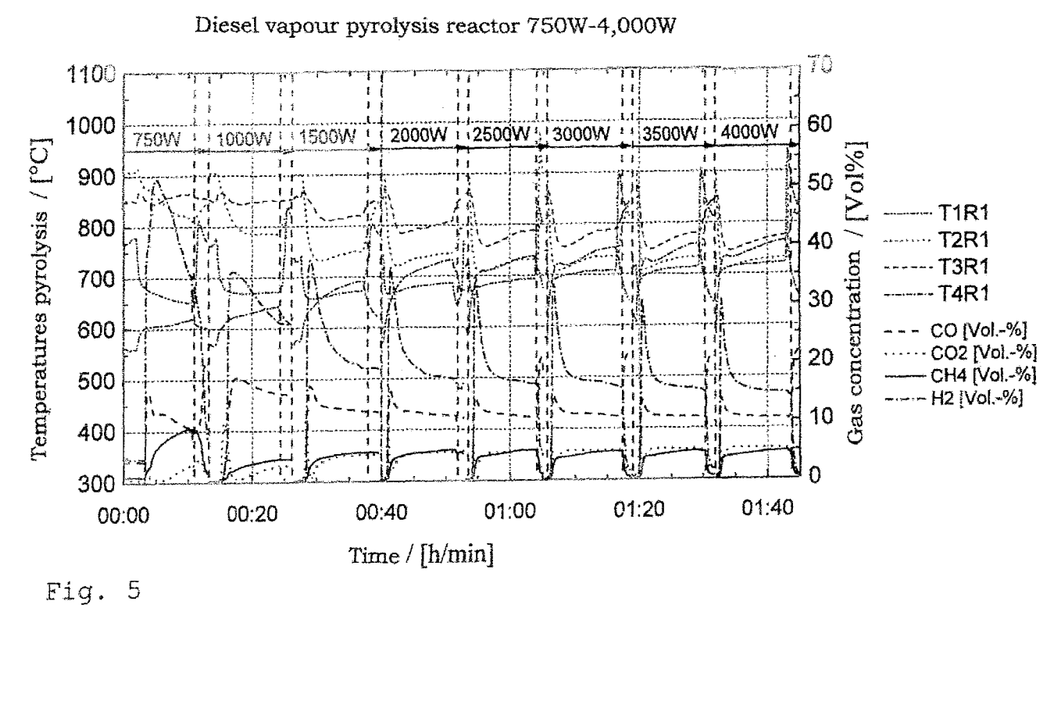
FIG. 5 shows the gas composition during pyrolysis at different input performances.

FIG. 5 shows the results of a "diesel vapour"—pyrolysis with various thermal input performances (relative to the heating value of diesel). The tests were implemented with a catalyst volume of 77 ml.

FIG. 5 shows the gas composition during pyrolysis at different input performances (relative to the quantity of diesel at the entrance of the evaporator). Tests have shown that the pyrolysis can be operated with a high thermal input performance.

Tests have shown that the fairly long hydrocarbon chains are also cracked at higher thermal input performances. Shorter chains and above all a high proportion of olefins are produced. Measurements have shown that, at 4 kW$_{th}$ and after cooling of the product gas to 20° C., almost all the hydrocarbons are still present in gaseous form. The hydrocarbon chains were accordingly able to be cracked up to <C 8. In the case of regeneration of particulate filters, the gas mixture can hence be ignited at significantly lower temperatures at an oxidation catalyst. The gas composition (H$_2$, CO, HC) offers in addition, as shown in Table 2, great advantages in the conversion of NO$_x$.

Regeneration of the catalyst can be implemented with exhaust gas instead of air. The residual oxygen in diesel engines suffices entirely for this purpose. Advantages are offered in addition by the water comprised in the exhaust gas; the carbon can be converted with water likewise to form a synthesis gas. This reaction is endothermal and can prevent any possibly occurring temperature peaks during regeneration.

Figure 6:
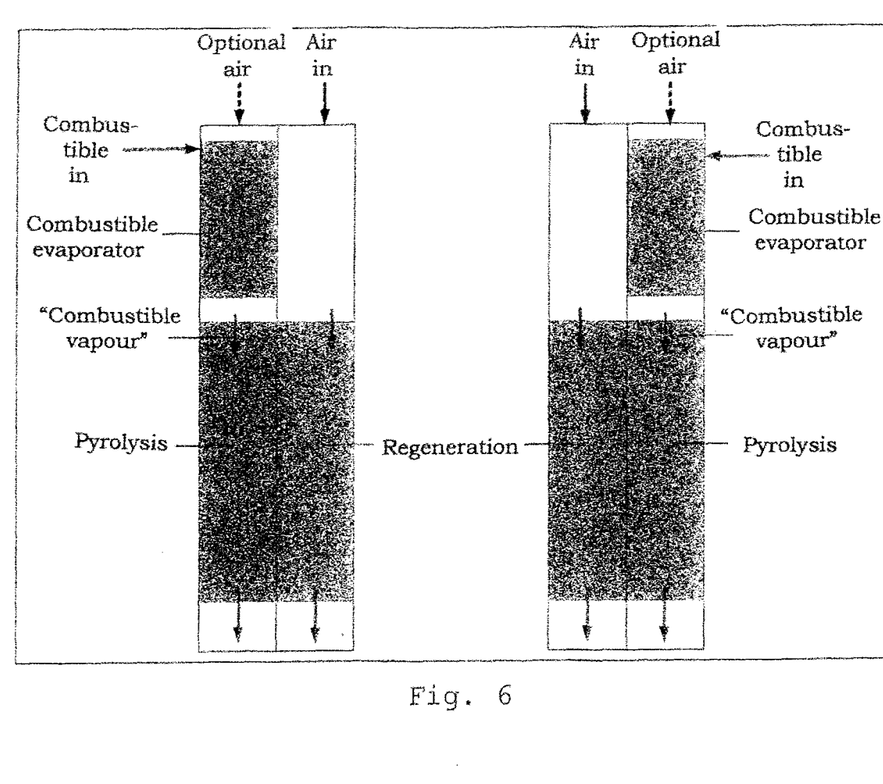
FIG. 6 shows two combustible evaporators and pyrolysis reactors which are separated from each other spatially.

The reactor can be designed such that it comprises two catalyst beds (honeycombs etc.) which pyrolyse and regenerate alternately. During regeneration, the heat is made available for the pyrolysis. A possible design variant is illustrated in FIG. 6. The combustible is conducted alternately into the left or into the right combustible evaporator.

FIG. 6 shows two combustible evaporators and pyrolysis reactors which are separated from each other spatially. The two beds are pyrolysed and regenerated alternately. The heat for the pyrolysis is thereby delivered by the regeneration cycle. For clarification of the method course, the combustible evaporator is not illustrated in both parts of the reactor in FIG. 6 in which the regeneration takes place, however said combustible evaporator is nevertheless present in the respective part of the reactor.

Figure 7:
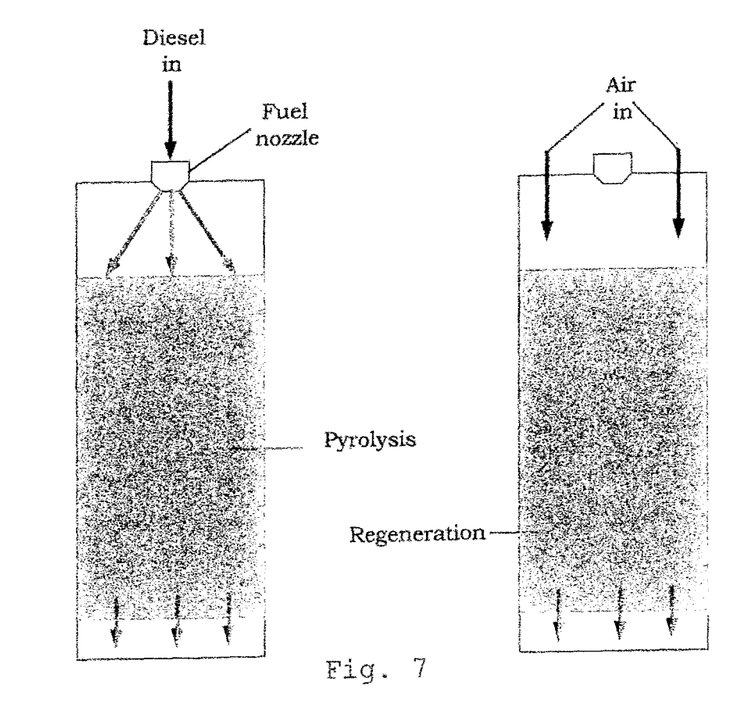
FIG. 7 shows the pyrolysis system with direct injection.

The combustible can be conducted directly, as a further modification, without pre-evaporation into the pyrolysis reactor (see FIG. 7). In the case of fuels without oxygen compounds, predominantly H$_2$ and CH$_4$ are produced thermodynamically. Introduction of the fuel can be effected via a nozzle. The combustible and the air for the regeneration are supplied intermittently and alternately.

FIG. 7 shows the pyrolysis system with direct injection. The combustible and the air for the regeneration are supplied intermittently.

Direct injection can be extended with a second catalyst bed (see FIG. 8). Whilst the combustible is pyrolysed in a catalyst bed, the other catalyst bed is regenerated. The regeneration cycle provides the heat for the pyrolysis. The temperature no longer cools so greatly during the pyrolysis.

All design variants can be constructed cylindrically or in a planar manner.

In the following section, the production and composition of a catalyst according to the invention, which can be operated with a large band width of usable materials, is described.

As carrier of the catalyst, $SiO_2$ with a small surface area (carrier by Alfa Aesar, low surface) is used. The active components of the catalyst are Fe and Ni. The molar ratio between Fe and Ni can be in the range of 3/1 to 1/5. The total metal content can be between 0.5 and 15% by weight. The optimum Fe/Ni ratio is 1/3. The catalyst was produced as follows (the data relate to the coating of 500 g $SiO_2$).

Production of a solution made of:
  60.88 g $Ni(NO_3)_2 \times 6H_2O$
  28.15 g $Fe(NO_3)_3 \times 9H_2O$
  88 g citric acid
  filled up with 53.6 g $H_2O$
Impregnation of the $SiO_2$ carrier with the solution
Drying
  2 days at 25° C.,
  1 day at 88° C.
  10 hours at 100-120° C.
Calcination
  4 hours at 600° C.

What is claimed is:

1. An exhaust gas purification device, comprising
   a) at least one pyrolysis reactor which has a catalyst and which, by means of intermittently progressing anaerobic catalytic pyrolysis of combustibles, selected from the group consisting of liquid or gaseous hydrocarbons, oxygen-comprising combustibles, liquid or gaseous hydrocarbon mixtures or gas mixtures which comprise hydrocarbons and aerobic regeneration of the catalyst, enables the production of a hydrogen-comprising gas mixture and a hydrogen-comprising gas mixture with cracked products from the material used, and
   b) connected subsequent to the pyrolysis reactor
      i. at least one oxidation catalyst and/or a soot particulate filter and/or
      ii. at least one catalyst for reducing the content of nitrous gases ($NO_x$ catalyst) and/or
      iii. at least one "Lean $NO_x$ Trap (LNT)" and/or a particulate filter,
   the oxidation catalyst and/or the soot particulate filter and/or the $NO_x$ storage catalyst and/or LNT and soot particulate filter being disposed in the exhaust gas flow of a combustion device.

2. The exhaust gas purification device according to claim 1, wherein the pyrolysis reactor includes a housing, in the interior of which the catalyst is arranged, the catalyst including a carrier which is coated at least partially with an alloy, comprising iron and nickel.

3. The exhaust gas purification device according to claim 2, wherein the molar ratio between iron and nickel is between 3:1 and 1:5.

4. The exhaust gas purification device according to claim 2, wherein the total content of nickel and iron relative to the carrier is between 0.5 and 15% by weight.

5. The exhaust gas purification device according to claim 2, wherein the material of the carrier is selected from the group consisting of ceramic materials.

6. The exhaust gas purification device according to claim 2, wherein the catalyst is present in the form of a powder, a granulate, a honeycomb, a foam, a net or a metal sheet.

7. The exhaust gas purification device according to claim 1, including a combustible evaporator which is arranged in the housing of the pyrolysis reactor and connected upstream of the catalyst or is connected upstream of the pyrolysis reactor as a separate component.

8. The exhaust gas purification device according to claim 1, wherein the pyrolysis reactor, along its direction of flow,
   i. has a one-part configuration and/or
   ii. has an at least two-part configuration.

9. The exhaust gas purification device according to claim 1, wherein the pyrolysis reactor has at least one inlet in the form of
   a) at least one air supply and/or
   b) at least one supply line for the fuels.

10. The exhaust gas purification device according to claim 9, wherein
    a) the soot particulate filter is a diesel soot particulate filter selected from the group consisting of wall flow filters and/or partial flow filters,
    b) an oxidation catalyst or an LNT (Lean $NO_x$ Trap) is connected in front of the soot particulate filter and/or
    c) the $NO_x$ catalyst is selected from the group consisting of $NO_x$ storage catalysts).

11. The exhaust gas purification device according to claim 1, wherein the pyrolysis reactor is arranged in the main flow or in a side flow of the exhaust gas flow of the combustion unit, or is configured as a separate component.

12. A method for exhaust gas purification of exhaust gases originating from a combustion device by soot particulate filter regeneration and/or at least partial removal of soot particulates and/or nitrous gases from the exhaust gases, in which, in the exhaust gas flow of the combustion device, at least one oxidation catalyst and/or one particulate filter and/or at least one catalyst for reducing the content of nitrous gases ($NO_x$ catalyst) is arranged,
    wherein
    the at least one soot particulate filter and/or at least one $NO_x$ catalyst is supplied at least temporarily during the combustion process with hydrogen-rich gas mixtures or synthesis gases which are produced by intermittently progressing anaerobic catalytic pyrolysis of combustibles, selected from the group consisting of liquid or gaseous hydrocarbons, liquid or gaseous hydrocarbon mixtures, oxygen-comprising combustibles or gas mixtures which comprise hydrocarbons, and with carbon monoxide-comprising gas mixtures or synthesis gases which are produced by aerobic regeneration of the catalyst.

13. The method according to claim 12, wherein the combustibles are contacted with a pyrolysis-catalysing catalyst during the catalytic pyrolysis and, at temperatures between 300 and 1,000° C., is/are pyrolysed to form a hydrogen-comprising gas mixture.

14. The method according to claim 12, wherein the pyrolysis is implemented alternately with a regeneration phase, wherein oxygen or an oxygen-comprising gas mixture, but no combustible, is supplied to the reactor during the regeneration phase.

15. The method according to claim 14 wherein a pyrolysis reactor is used, which, along its throughflow direction
   i. has a one-part configuration and is pyrolysed and regenerated in alternating operation,
   ii. has an at least two-pert configuration,
   at least two catalysts being pyrolysed and regenerated antipodally in the two parts of the pyrolysis reactor.

16. The method according to claim 12, wherein, in the case where liquid combustibles are used, an evaporation is implemented before the pyrolysis step and the combustibles are supplied subsequently to the pyrolysis step in gaseous form.

17. The method according to claim 16, wherein the evaporation enthalpy, which is required for evaporation of the liquid combustibles, is provided by partial oxidation of the used liquid combustibles and/or by heat exchange with the exhaust gases originating from the combustion device.

18. The method according to claim 12, wherein, before or during the first beginning of the pyrolysis, the catalyst and/or the pyrolysis reactor and/or the evaporator is heated by separate heating and/or by oxidation of the combustibles and/or by heat exchange with the combustion exhaust gases.

19. A catalyst including a ceramic carrier which is coated at least partially with an alloy, comprising iron and nickel.

20. The method for producing a catalyst according to claim 19, in which a ceramic carrier material is wetted with an aqueous solution, comprising iron- and nickel salts and also a complexing agent, dried and subsequently calcinated at temperatures above 200° C., the complexing agent being used superstoichiometrically with respect to the total quantity of iron- and nickel salts.

21. A pyrolysis reactor which includes a housing having at least one front-side inlet and at least one rear-side outlet and also at least one catalyst according to claim 19 which is arranged in the housing between inlet and outlet.

\* \* \* \* \*